(12) United States Patent
Tsuchida et al.

(10) Patent No.: US 9,302,362 B2
(45) Date of Patent: Apr. 5, 2016

(54) DOOR MECHANISM OF MACHINE TOOL

(71) Applicant: Okuma Corporation, Niwa-Gun (JP)

(72) Inventors: Tomofumi Tsuchida, Niwa-Gun (JP); Makoto Tomita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 14/219,467

(22) Filed: Mar. 19, 2014

(65) Prior Publication Data

US 2014/0318019 A1   Oct. 30, 2014

(30) Foreign Application Priority Data

Apr. 25, 2013  (JP) .................................. 2013-092751

(51) Int. Cl.
*B23Q 11/08* (2006.01)
*B23Q 1/66* (2006.01)
*B23Q 7/14* (2006.01)

(52) U.S. Cl.
CPC .............. *B23Q 11/0825* (2013.01); *B23Q 1/66* (2013.01); *B23Q 7/1431* (2013.01); *B23Q 11/0891* (2013.01)

(58) Field of Classification Search
USPC .................... 49/128, 129, 130, 366, 370, 127
IPC ............... B23Q 11/0825,7/1431, 1/66, 11/0891
See application file for complete search history.

(56) References Cited

U.S. PATENT DOCUMENTS

| | | | | | |
|---|---|---|---|---|---|
| 846,573 | A | * | 3/1907 | Kupelwieser | 49/98 |
| 1,959,941 | A | * | 5/1934 | Wiley | 49/109 |
| 2,437,730 | A | * | 3/1948 | Eisinger | 49/129 |
| 3,064,723 | A | * | 11/1962 | Paillard et al. | 160/194 |
| 6,193,048 | B1 | * | 2/2001 | Keith | 198/346.1 |
| 7,845,116 | B2 | * | 12/2010 | Masuda | 49/223 |
| 7,849,633 | B2 | * | 12/2010 | Oshima et al. | 49/209 |
| 8,806,807 | B2 | * | 8/2014 | Rees | 49/257 |
| 2004/0182680 | A1 | * | 9/2004 | Stave | 198/346.1 |
| 2009/0271025 | A1 | * | 10/2009 | Brauchle | 700/166 |

FOREIGN PATENT DOCUMENTS

JP   02-78245 U   6/1990

* cited by examiner

*Primary Examiner* — Gregory Strimbu
(74) *Attorney, Agent, or Firm* — Burr & Brown, PLLC

(57) ABSTRACT

A door mechanism of a machining center includes a wide door panel, narrow door panels, a pair of upper and lower slide rails into which the wide door panel and the narrow door panels are fitted, and a plurality of motors that serve as drive units for independently driving the wide door panel and the narrow door panels. The wide door panel and the narrow door panels are arranged in line extending across an opening of the machining center to close the opening of the machining center and are slidable in a direction parallel to a width of the opening to open a portion of the opening having a width approximately twice a width of a one of the narrow door panels.

3 Claims, 5 Drawing Sheets

DOOR MECHANISM OF MACHINE TOOL

CROSS-REFERENCE TO RELATED APPLICATION

This application claims the benefit of Japanese Patent Application Number 2013-092751 filed on Apr. 25, 2013, the entirety of which is incorporated by reference.

BACKGROUND OF THE INVENTION

1. Field of the Invention

The present invention relates to a door mechanism provided to a cover of a machine tool having automatic pallet changers.

2. Description of Related Art

Machine tools such as machining centers are provided with a main spindle unit provided with a tool. The main spindle unit can be brought closer to and away from a table on which a pallet is placeable. A workpiece (object to be machined) is placed on the pallet on the table, and machined with the main spindle unit brought closer to the table. In such machine tools, automatic pallet changers are usually provided (arranged side by side) for transporting pallets with a workpiece mounted thereon onto and out of the table in order to change an unmachined workpiece and a machined workpiece in a short time.

In addition, such machine tools are normally provided with a cover that covers the periphery of the main spindle unit, the table, and so forth in order to prevent chips and a cutting fluid from being scattered. An opening portion is formed between the cover and the automatic pallet changers positioned outside the cover. A door mechanism is provided to open and close the opening portion. In the door mechanism, it is well known that a plurality of door panels are slid in the up-down direction or the left-right direction. Besides, other types of door mechanisms in which the door panels are folded rearward while sliding in the left-right direction as described in Japanese Unexamined Utility Model Application Publication No. 2-78245 is also known.

SUMMARY OF THE INVENTION

However, use of a door mechanism in which the door panels are slid in the up-down direction inevitably increases the height of the cover, and use of a door mechanism in which the door panels are slid in the left-right direction inevitably increases the width of the cover. In addition, in the door mechanism in which the door panels are slid in the left-right direction, a plurality of door panels are stacked in the front-rear direction in order to reduce the width of the cover. However, the plurality of door panels stacked in the front-rear direction may increase a gap between rails on the table side and rails on the pallet changing unit side. Therefore, it is necessary to reduce the moving speed of the pallets in order to suppress a shock caused when the pallets pass over the gap during automatic pallet changing (APC) operation, which increases the APC time. Meanwhile, the door mechanism of the type in which the door panels are folded rearward while sliding in the left-right direction as described in JP 2-78245 U is complicated in structure. In addition, it is necessary to secure a space required for the door panels to be folded around the table, which makes it difficult to change an unmachined workpiece and a machined workpiece in a short time.

It is an object of the present invention to address the issue of the door mechanism of a machine tool according to the related art described above, and to provide a door mechanism of a machine tool that can make the machine tool compact and inexpensive and that enables an unmachined workpiece and a machined workpiece to be changed in a short time with no need to reduce the moving speed of pallets during APC operation.

In a first aspect of the present invention, a door mechanism is provided in a machine tool including a cover that defines a machining chamber inside thereof, a table on which a pallet is placeable and which is provided in the machining chamber so as to be movable in a width direction, and two pallet changing units provided outside the cover and arranged side by side along a moving direction of the table, the door mechanism being provided between the cover and the pallet changing units. The door mechanism includes a center panel and two side panels arranged in line so as to be slidable in the width direction such that an opening portion is opened and closed, and an opening width has a length suitable for a length of the largest workpiece to be placed on the pallet. The largest workpiece is determined as a size which is allowed to be machined by the machine tool. The opening width refers to a width that is necessary and sufficient to move a pallet with a workpiece mounted thereon from one of the pallet changing units to the table, which corresponds a width of about 1.1 to 1.5 times the width of the largest workpiece to be placed on one pallet.

In a second aspect of the present invention provides the door mechanism according to the first aspect, a joint position between the center panel and the side panels when the door mechanism is in a closed state is located about at a middle of the opening width when the door mechanism is in an open state.

In the door mechanism of a machine tool according to the first aspect, the door mechanism includes the center panel and the two side panels arranged in line so as to be slidable in the width direction such that an opening portion is opened and closed, and the opening width has a length suitable for the length of the largest workpiece to be placed on the pallet. Therefore, the sliding length of the panels is relatively short even though the door mechanism is of a transversely opening type, which reduces the space for housing the panels in the open state. Hence, the door mechanism enables the machining center to have a compact size. In addition, the gap between the rails on the table side and the rails on the pallet changing unit side can be reduced because the center panel and the side panels are arranged in line. This allows an increase in moving speed of the pallets during APC operation, which saves the APC time. Further, the slide stroke of the center panel and the two side panels is suppressed to be minimum. Therefore, an unmachined workpiece and a machined workpiece can be changed in a significantly short time.

In the door mechanism of a machine tool according to the second aspect, the joint position between the center panel and the side panels in the closed state is located about at the middle of the opening portion in the open state. Therefore, the space for housing the panels in the open state can be further reduced to make the machining center more compact in size.

BRIEF DESCRIPTION OF THE DRAWINGS

FIGS. 4A and 4B illustrate an operating state of the door mechanism (with the right side of an opening portion being opened), in which FIG. 4A is a perspective view of the machining center and FIG. 4B is a conceptual diagram of the door mechanism.

FIGS. 5A and 5B illustrate an operating state of the door mechanism (with the left side of the opening portion being opened), in which FIG. 5A is a perspective view of the machining center and FIG. 5B is a conceptual diagram of the door mechanism.

DETAILED DESCRIPTIOIN OF THE INVENTION

Structure of Door Mechanism

Figure 1:
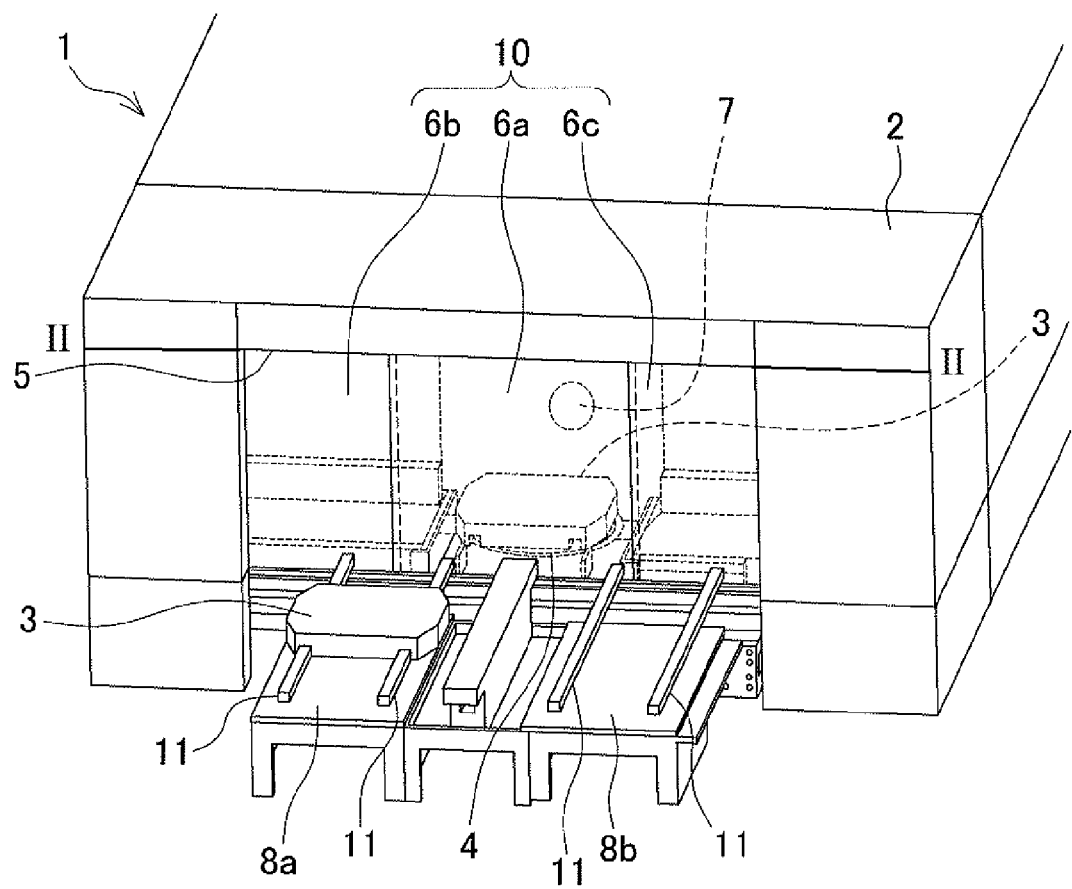
FIG. 1 is a perspective view of a machining center provided with a door mechanism.
Figure 2:
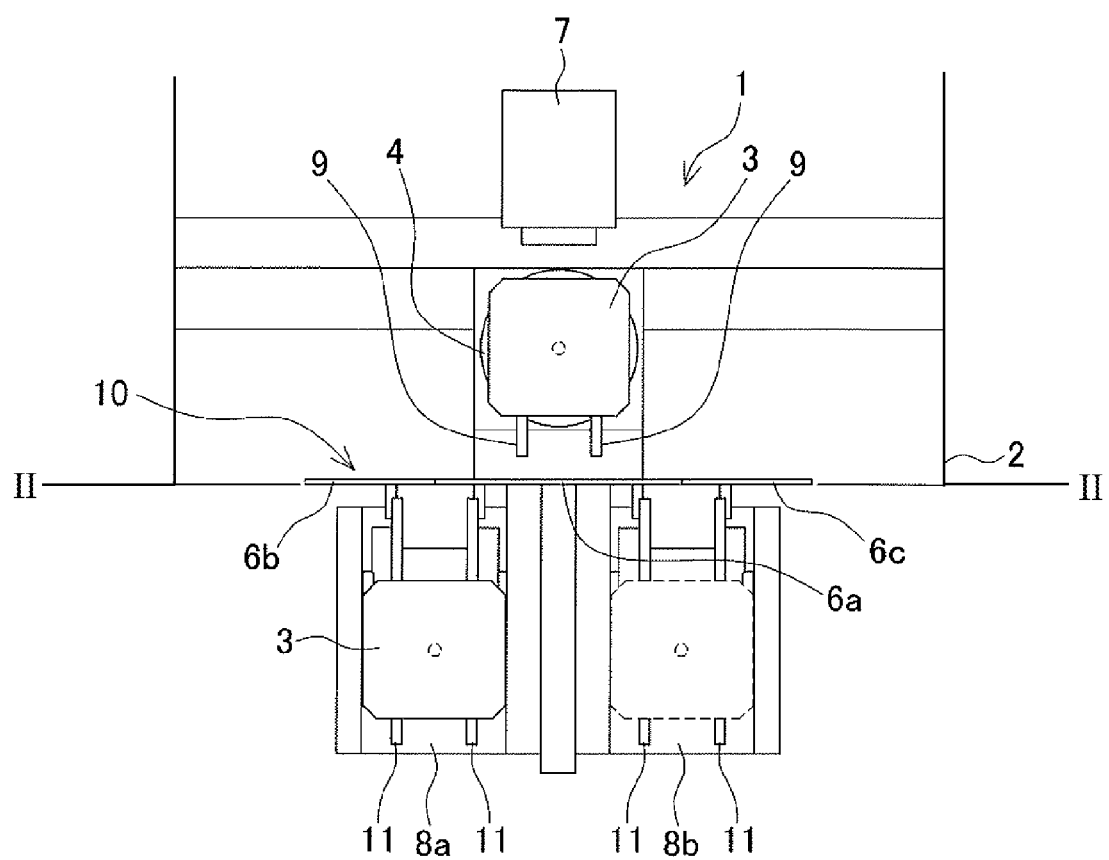
FIG. 2 illustrates a horizontal section of the machining center provided with the door mechanism along line II-II in FIG. 1.

A door mechanism of a machine tool according to an embodiment of the present invention will be described in detail below with reference to the drawings. FIGS. 1 and 2 illustrate a machining center that serves as a machine tool including the door mechanism according to the present invention. In a machining center 1, an outer periphery thereof is covered by a cover 2 that is made of metal and has the shape of a rectangular parallelepiped. The cover 2 defines a machining chamber inside thereof. A main spindle unit 7 to which a tool can be mounted is provided inside the machining chamber. A table 4 on which a pallet 3 is placeable is provided in front of the main spindle unit 7 so as to be movable in the width direction (left-right direction). Rails 9, 9 are installed on the table 4 (see FIG. 2). The pallet 3 can be slid in the front-rear direction along the rails 9, 9.

Two pallet changing units 8a, 8b are provided outside the cover 2, and arranged side by side along the moving direction of the table 4. Each of the pallet changing units 8a, 8b is provided with rails 11, 11. The pallet 3 can be slid in the front-rear direction along the rails 11, 11. A door mechanism 10 is provided between the pallet changing units 8a, 8b and the table 4 in the machining chamber. The door mechanism 10 includes a wide door panel 6a, narrow door panels 6b, 6c. The wide door panel 6a and the narrow door panels 6b, 6c cover a rectangular opening portion 5 formed in the front surface of the cover 2.

Figure 3:
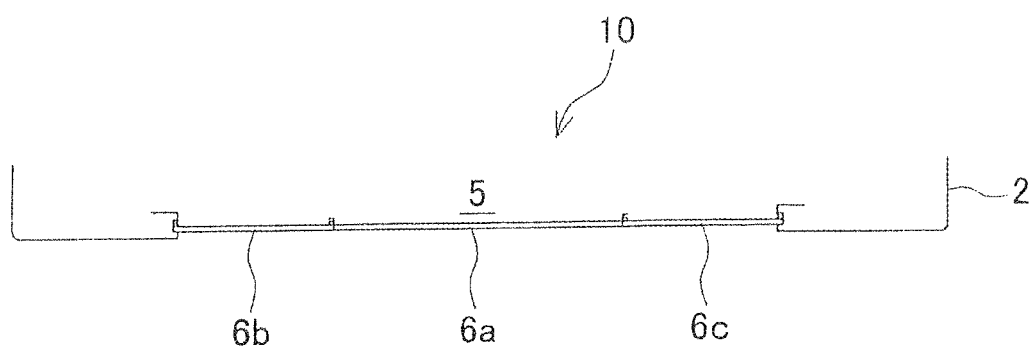
FIG. 3 is a conceptual diagram of the door mechanism (a horizontal sectional view of a front portion of the machining center).

FIG. 3 illustrates the concept of the door mechanism 10. The door mechanism 10 includes the wide door panel 6a serving as a center panel, the narrow door panels 6b, 6b serving as side panels, a pair of upper and lower slide rails (not illustrated) with a U-shaped section into which the wide door panel 6a and the narrow door panels 6b, 6c are to be fitted, three motors (not illustrated) that serve as drive units for driving (sliding) the wide door panel 6a and the narrow door panels 6b, 6c.

The wide door panel 6a is formed from a metal sheet of a predetermined thickness, and has a width (left-right width) that is about one-third of the width of the cover 2 and that allows passage of the largest workpiece to be placed on the pallet 3. The narrow door panels 6b, 6c are installed on the left and right, respectively, of the wide door panel 6a. The narrow door panels 6b, 6c are formed from a metal sheet of a predetermined thickness as with the wide door panel 6a, and have a width that is about half the width of the wide door panel 6a.

The upper and lower end edges of the wide door panel 6a and the narrow door panels 6b, 6c described above are fitted into the slide rails (not illustrated) with a U-shaped section. The opening portion 5 of the cover 2 can be closed, that is, the entirety of the opening portion 5 can be covered, by the wide door panel 6a and the narrow door panels 6b, 6c, with the right end edge of the left narrow door panel 6b and the left end edge of the wide door panel 6a in abutment with each other, and with the left end edge of the right narrow door panel 6c and the right end edge of the wide door panel 6a in abutment with each other.

The wide door panel 6a and the two narrow door panels 6b, 6c can be independently slid in the left-right direction by motors (not illustrated) with the upper and lower end edges of the door panels fitted into the slide rails (not illustrated). Rollers are provided between the lower end surfaces of the wide door panel 6a and the narrow door panels 6b, 6c and the bottom surfaces of the slide rails (not illustrated) to allow the wide door panel 6a and the two narrow door panels 6b, 6c to slide smoothly.

Content of Operation of Machining Center

Figure 4A:
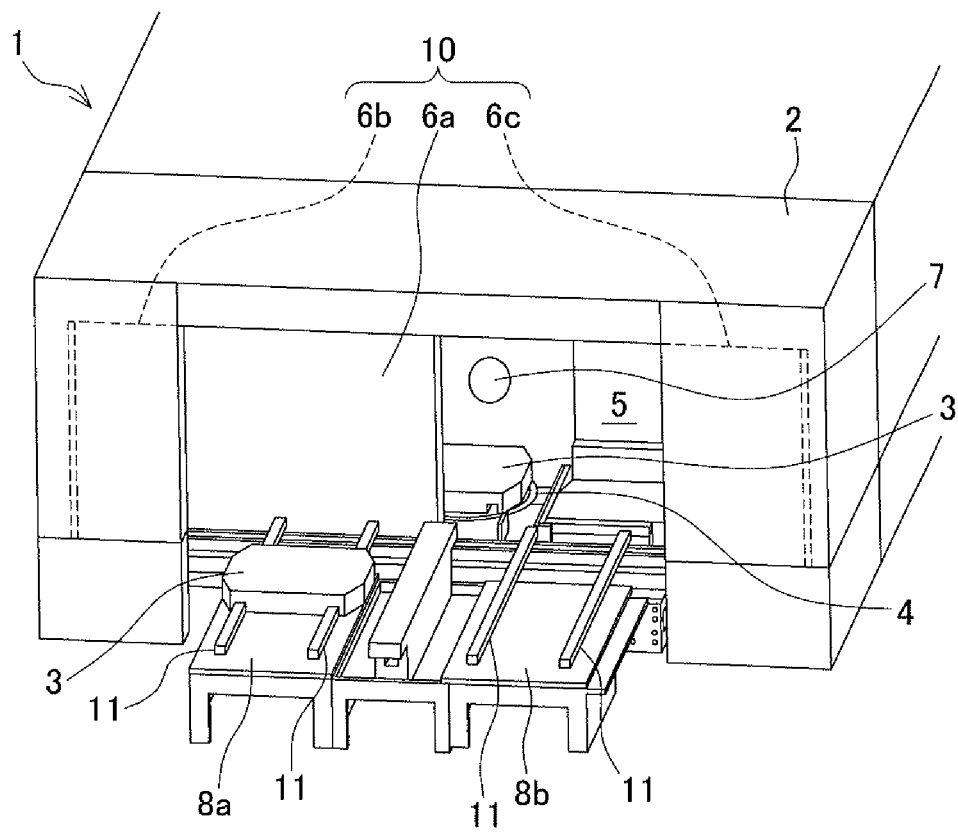
Figure 4B:
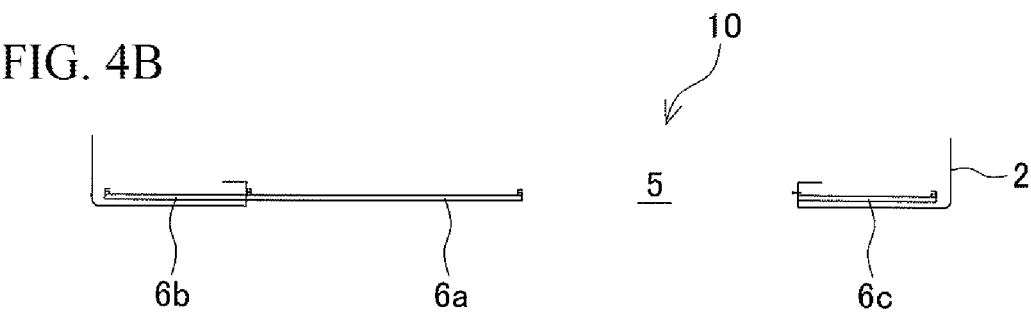

In the machining center 1 configured as described above, the pallet 3 with a workpiece (object to be machined) mounted thereon can be placed on each of the pallet changing units 8a, 8b. In the case where a workpiece mounted on the pallet 3 placed on the left pallet changing unit 8a is to be machined and the pallets 3, 3 are placed on the left pallet changing unit 8a and the table 4, the motors (not illustrated) are turned on to slide the wide door panel 6a and the narrow door panel 6b leftward by a predetermined length, and the narrow door panel 6c of the door mechanism 10 rightward by a predetermined length. The right narrow door panel 6c is slid rightward by a predetermined length (a length that is about the same as the width of the narrow door panel 6c) to move behind the cover 2, and the wide door panel 6a and the left narrow door panel 6b are slid leftward by a predetermined length (a length that is about the same as the width of the narrow door panel 6c) with respective adjacent end edges of the wide door panel 6a and the left narrow door panel 6b in abutment with each other as illustrated in FIGS. 4A and 4B. Consequently, about the right half of the opening portion 5 of the cover 2 is opened.

When about the right half of the opening portion 5 of the cover 2 is opened in this way, the table 4 is moved behind the right pallet changing unit 8b, and the pallet 3 placed on the table 4 is slid forward along the rails 11, 11 by a drive unit (not illustrated) to be placed on the right pallet changing unit 8b (on the rails 11, 11). After the pallet 3 is moved to the right pallet changing unit 8b, the table 4 is quickly moved behind the left pallet changing unit 8a.

On the other hand, a workpiece is mounted on the pallet 3 placed on the left pallet changing unit 8a in preparation for machining the workpiece. In the door mechanism 10, when the movement of the table 4 is finished, the wide door panel 6a is slid rightward by a predetermined length (a length that is about the same as the width of the wide door panel 6a) from the state of FIGS. 4A and 4B. Accordingly, the right end edge of the wide door panel 6a is brought into abutment with the left end edge of the right narrow door panel 6c (with the left narrow door panel 6b moved behind the cover 2 by a predetermined length as described above). Consequently, about the left half of the opening portion 5 of the cover 2 is opened.

When about the left half of the opening portion 5 of the cover 2 is opened in this way, the pallet 3 placed on the left pallet changing unit 8a is slid rearward by a drive unit (not illustrated) together with the workpiece along the rails 11, 11 to be placed on the table 4 (on the rails 9, 9) in the machining chamber. When the pallet 3 with the workpiece mounted thereon is placed on the table 4, the narrow door panel 6b of the door mechanism 10 is slid rightward by a predetermined length (a length that is about the same as the width of the narrow door panel 6b), and the wide door panel 6a and the narrow door panel 6c are slid leftward by a predetermined length (a length that is about the same as the width of the narrow door panel 6c) with respective adjacent end edges of the wide door panel 6a and the narrow door panel 6c in abutment with each other. Consequently, the opening portion 5 is covered by the wide door panel 6a and the narrow door panels 6b, 6c. Further, at the same time as the operation of the door mechanism 10, the table 4 is moved in the left-right direction by a drive device (not illustrated), and the main spindle unit 7 is moved in the up-down and front-rear directions, which enables the workpiece mounted on the pallet 3 to be machined.

Figure 5A:
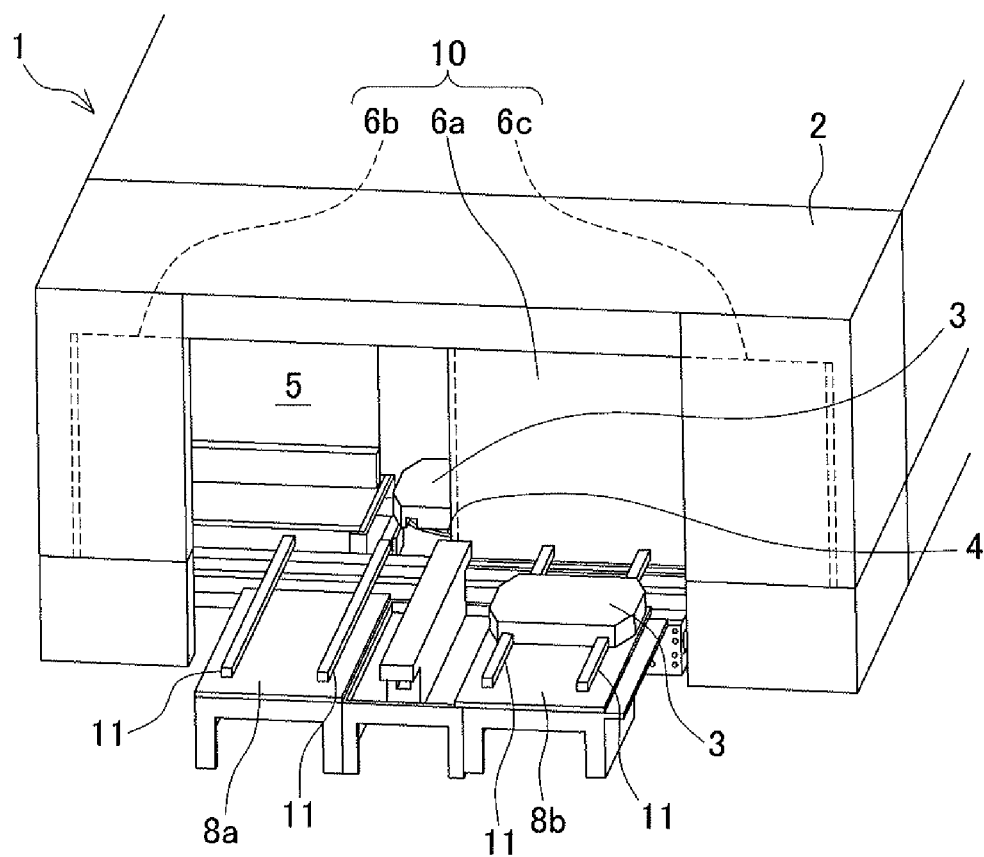
Figure 5B:
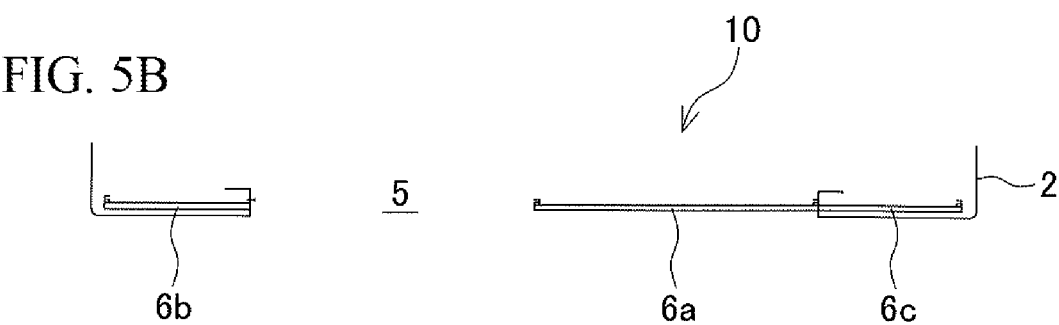

During machining of the workpiece, the next workpiece is mounted on the pallet 3 on the right pallet changing unit 8b in preparation for machining of the next workpiece. When machining of the preceding workpiece is finished, the main spindle unit 7 is moved to a retracted position. At the same time, the motors are turned on to slide the narrow door panel 6b leftward by a predetermined length, and the wide door panel 6a and the narrow door panel 6c of the door mechanism 10 rightward by a predetermined length. The left narrow door panel 6b is slid leftward by a predetermined length (a length that is about the same as the width of the narrow door panel 6b), and the wide door panel 6a and the right narrow door panel 6c are slid rightward by a predetermined length (a length that is about the same as the width of the narrow door panel 6c) with respective adjacent end edges in abutment with each other as illustrated in FIGS. 5A AND 5B. Consequently, about the left half of the opening portion 5 of the cover 2 is opened. Further, at the same time as such operation of the door mechanism 10, the table 4 is moved behind the left pallet changing unit 8a, and the pallet 3 on the table 4 is slid forward along the rails 9, 9 by a drive unit (not illustrated) together with the workpiece which has been machined to be placed back on the left pallet changing unit 8a (on the rails 11, 11). After the pallet 3 is moved to the left pallet changing unit 8a, the table 4 is quickly moved behind the right pallet changing unit 8b.

As described above, when the table 4 is moved behind the right pallet changing unit 8b, the motor for sliding the wide door panel 6a of the door mechanism 10 is turned on to slide the wide door panel 6a leftward by a predetermined length (a length that is about the same as the width of the wide door panel 6a) to open about the right half of the opening portion 5 of the cover 2. When about the right half of the opening portion 5 is opened in this way, the pallet 3 placed on the right pallet changing unit 8b is slid rearward by a drive unit (not illustrated) together with the workpiece along the rails 11, 11 to be placed on the table 4 (on the rails 9, 9) in the machining chamber.

Then, the machining center 1 repeatedly performs the operation described above until machining of all the workpieces is finished. In a series of the operation, after the pallet 3 with an unmachined workpiece mounted thereon is moved from the pallet changing unit on one side to the table 4, the opening portion 5 is closed by the door mechanism 10. Then, the table 4 is moved, and the workpiece is machined. After that, one side of the opening portion 5 is opened by the door mechanism 10, and the table 4 is moved, and then the pallet 3 with the machined workpiece mounted thereon is moved from the table 4 to the pallet changing unit on one side. Subsequently, the opposite side of the opening portion 5 is opened by the door mechanism 10 and the table 4 is moved, so that the pallet 3 with an unmachined workpiece mounted thereon is moved from the pallet changing unit on the opposite side to the table 4. Then, the opening portion 5 is closed by the door mechanism 10 and the table 4 is moved so that the workpiece is machined.

In the door mechanism 10 of the machining center 1, the wide door panel 6a and the narrow door panels 6b, 6c are slid as described above, and the open/close stroke is determined to be minimum. Thus, the width of a machine tool (that is, the left-right width of the cover 2) can be designed to be a minimum necessary width, and the open/close time can be made shortest in the case where opening/closing of the wide door panel 6a and the narrow door panels 6b, 6c is automatically controlled.

Effects of Door Mechanism

In the door mechanism 10 of the machining center 1, as described above, the wide door panel 6a serving as a center panel and the narrow door panels 6b, 6c serving as side panels are arranged side by side in line so as to be slidable in the width direction. An opening width has a length suitable for the length of the largest workpiece to be placed on the pallet 3. Therefore, the sliding length of the wide door panel 6a and the narrow door panels 6b, 6c is relatively short even though the door mechanism 10 is of a transversely opening type, which reduces the space for housing the narrow door panels 6b, 6c when the door mechanism 10 is in an open state. Hence, the door mechanism 10 enables the machining center 1 to have a compact size (minimum transverse width). In addition, the gap between the rails 9, 9 on the table 4 side and the rails 11, 11 on the pallet changing units 8a, 8b side can be reduced because the wide door panel 6a and the narrow door panels 6b, 6c are arranged in line. This allows an increase in moving speed of the pallets 3 during APC operation, which saves the APC time.

In the door mechanism 10 of the machining center 1, further, the slide stroke of the wide door panel 6a and the narrow door panels 6b, 6c during opening/closing is determined to be minimum. Therefore, the open/close time can be made shortest in the case where opening/closing of the wide door panel 6a and the narrow door panels 6b, 6c is automatically controlled.

In the door mechanism 10 of the machining center 1, in addition, the joint position between the wide door panel 6a and the narrow door panels 6b, 6c when the door mechanism 10 is in a closed state is located about at the middle of an opening portion 5 when the door mechanism 10 is in the open state. Therefore, the space for housing the narrow door panels 6b, 6c in the open state can be further reduced to make the machining center 1 more compact in size.

Modifications of Door Mechanism

The configuration of the door mechanism according to the present invention is not limited in any way to the embodiment described above. Changes may be made as appropriate and as necessary without departing from the scope and spirit of the present invention in the configuration of the cover, the door panels (the wide door panel and the narrow door panels), the table, the main spindle unit. In addition, the machine tool provided with the door mechanism according to the present invention is also not limited to the machining center according to the embodiment described above, and may be changed to various types of machine tools.

For example, the three door panels are not limited to those which are independently driven by separate drive devices (such as motors), and may be changed to those which are independently driven by one or two drive devices utilizing a gear. In addition, the door panels are not limited to those which slide with the upper and lower end edges fitted in the slide rails with a U-shaped section, and may be changed to those which are provided with rollers having recessed grooves in the upper and lower end edges and which slide with projected rails fitted in such recessed grooves.

What is claimed is:

1. A door mechanism for a machine tool including a cover, a table and two pallet changing units, the cover defines at least one side of a machining chamber of the machine tool and includes an opening having a width and a height, the table is adapted to receive a pallet and is provided in the machining chamber so as to be movable parallel to the width of the opening, and the two pallet changing units are provided outside the cover and are arranged adjacent one another, the door mechanism being provided between the table in the machining chamber and the two pallet changing units, said door mechanism comprising:

a center panel, a first side panel and a second side panel, each said side panel having a predetermined width and the center panel having a width that is about twice the width of each one of said side panels, each of the center panel, the first side panel and the second side panel being movable parallel to the width of the opening, and wherein the door mechanism is in a closed position and closes the opening when the first side panel, the center panel and the second side panel abut one another and are arranged generally coplanar across the width of the opening between first and second portions of the cover that define side boundaries of the opening, wherein the door mechanism is in an open position and opens a first portion of the opening adjacent to one of the two pallet changing units when the first side panel is moved in a first direction parallel to the width of the opening for a distance approximately equal to the width of the first side panel to position the first side panel behind the first portion of the cover adjacent to the first side panel and when the center panel and the second side panel move in a second direction that is opposite to the first direction and is parallel to the width of the opening for a distance approximately equal to the width of the second side panel to position the second side panel behind the second portion of the cover adjacent to the second side panel, and when the door mechanism is in the open position, the first and second side panels and the center panel are generally coplanar and a width of the first portion of the opening adjacent to the one of the two pallet changing units is approximately twice the width of one of the first side panel and the second side panel.

2. The door mechanism according to claim 1, wherein when the door mechanism is in the closed position, the center panel and the first side panel abut at a position which is at about a middle of the first portion of the opening when the door mechanism is in the open position.

3. The door mechanism according to claim 1, wherein when the door mechanism is in the open position and the center panel is moved from a position in abutment with the second side panel to a position in abutment with the first side panel, the door mechanism opens a second portion of the opening adjacent to the other one of the two pallet changing units.

* * * * *